United States Patent [19]

Philips et al.

[11] Patent Number: 4,458,753
[45] Date of Patent: Jul. 10, 1984

[54] STABILIZING POLYSACCHARIDE SOLUTIONS FOR TERTIARY OIL RECOVERY AT ELEVATED TEMPERATURE WITH BOROHYDRIDE

[75] Inventors: Judson C. Philips, Gales Ferry; Bryce E. Tate, Niantic, both of Conn.

[73] Assignee: Pfizer Inc., New York, N.Y.

[21] Appl. No.: 434,669

[22] Filed: Oct. 15, 1982

[51] Int. Cl.³ .............................................. E21B 43/22
[52] U.S. Cl. .................................. 166/246; 166/275; 252/8.55 D; 435/104
[58] Field of Search ............... 166/246, 273, 274, 275; 252/8.55 D; 435/104, 101

[56] References Cited

U.S. PATENT DOCUMENTS

| | | | |
|---|---|---|---|
| 3,096,293 | 7/1963 | Jeanes et al. | 435/104 |
| 4,141,842 | 2/1979 | Abdo | 252/8.55 D |
| 4,218,327 | 8/1980 | Wellington | 252/8.55 D |
| 4,232,739 | 11/1980 | Franklin | 166/246 |
| 4,256,590 | 3/1981 | Naslund et al. | 166/246 X |

FOREIGN PATENT DOCUMENTS 2000823A 1/1979 United Kingdom .

Primary Examiner—Stephen J. Novosad
Attorney, Agent, or Firm—Charles J. Knuth; Peter C. Richardson; Harold W. Ordway

[57] ABSTRACT

A method of tertiary oil recovery from petroleum-containing formations at elevated temperature comprises injecting a substantially oxygen-free aqueous saline solution of water-soluble polysaccharide biopolymer treated at pH of at least 5 by the addition of alkali metal borohydride as viscosity stabilizer.

5 Claims, 6 Drawing Figures

FLOCON Biopolymer 4800
Sea Water, (90°C)

Fig. 4. FLOCON Biopolymer 4800 Sea Water, (90°C)

Fig. 5. FLOCON Biopolymer 4800 0.3% NaCl (90°C)
⊙ 50 ppm Sodium Borohydride

FLOCON Biopolymer 4800
Sea Water, (90°C)

⊙ 25 ppm Sodium Borohydride

STABILIZING POLYSACCHARIDE SOLUTIONS FOR TERTIARY OIL RECOVERY AT ELEVATED TEMPERATURE WITH BOROHYDRIDE

BACKGROUND OF THE INVENTION

This invention concerns a method of stabilizing polysaccharide biopolymer solutions employed in tertiary oil recovery at elevated temperature.

Tertiary oil recovery is commonly used today to recover the oil which remains in a subterranean petroleum-containing formation after primary and secondary recovery techniques have been exhausted.

One approach to tertiary oil recovery is polymer flooding. In this approach, certain organic polymers are added to at least a portion of the fluid injected into the formation to thicken the fluid and thereby improve the mobility of the entrapped oil as the fluid is driven from the injection site to the production well. Among these polymers are the xanthan gums, hydrophilic polysaccharides produced by fermentation using bacteria of the genus Xanthomonas. The biopolymer may be used in the form of the fermentation broth itself, as exemplified in U.S. Pat. No. 4,119,546, or in isolated and reconstituted form, as disclosed in U.S. Pat. No. 3,305,016. Xanthan gums are particularly desirable for polymer flooding since they are good displacing agents; give useful viscosities at low concentrations (5 to 90 centipoises at 100 to 3,000 ppm); are not lost by extensive adsorption of the porous rock formations; are relatively insensitive to salts, not precipitating or losing viscosity under normal conditions; and are reasonably shear stable and viscosity stable over a wide pH range. Other polysaccharide biopolymers include such as those derived from the genus Sclerotium and from the genus Alcaligenes, the use of which in enhanced oil recovery is described, for example, in U.S. Pat. No. 3,372,749 British Patent Specification No. 2,082,189, respectively.

While xanthan polysaccharide biopolymer solutions have proven to be effective in tertiary oil recovery, one problem which has arisen with their use is in oil reservoirs at elevated temperatures of about 60°–150° C. There, the polymer solution tends to be unstable with significant loss in viscosity in a few days, particularly in low-saline (500 ppm or less total dissolved solids) waters.

Solutions to this problem have been suggested. In U.S. Pat. No. 4,141,842, for example, the polymer solution includes a $C_3$ to $C_5$ aliphatic alcohol to stabilize the polysaccharide. In U.S. Pat. No. 4,218,327, the stability of the solution viscosity is improved by initially deoxygenating the aqueous liquid with agents such as sodium hydrosulphite (sodium dithionite) and then adding a sulfur-containing antioxidant, a readily oxidizable water-soluble alcohol or glycol, and the polymer. And in U.K. Patent Application G.B. No. 2000823A, aqueous solutions of polymeric mobility control agents, including polysaccharides, are stabilized with an alkylene polyamine, alkanolamine or alicyclic polyamine; the solutions may also contain an oxygen scavenger such as sodium hydrosulfite.

The need still exists for, and it is the primary objective of the present invention to provide, a simple, economical and effective means of stabilizing polysaccharide biopolymer flood control solutions employed at elevated temperature.

SUMMARY OF THE INVENTION

It has now been found that excellent high-temperature stability of aqueous polysaccharide biopolymer solutions intended for tertiary oil recovery is obtained by the addition of alkali metal borohydride to the solution.

The present invention therefore entails a method of oil recovery from a subterranean petroleum-containing formation at elevated temperature penetrated by at least one injection well and by one production well in fluid communication with the formation, which comprises injecting into the formation a substantially oxygen-free aqueous saline solution of a water-soluble polysaccharide biopolymer which has been treated in solution at a pH of at least about 5 by the addition of an effective amount of alkali metal borohydride as viscosity stabilizer. The polymer is preferably derived from a fermentation broth containing cells of an organism belonging to the genus Xanthomonas, while the borohydride is preferably added in the amount of from about 5 to 100 ppm, especially as sodium borohydride in the amount of from about 10 to 50 ppm, and the saline solution preferably has a dissolved salt content of at least about 20,000 ppm.

BRIEF DESCRIPTION OF THE DRAWINGS

The above and other objects, features and advantages of the present invention will be appreciated from the following detailed description in conjunction with the accompanying drawings, in which.

DETAILED DESCRIPTION OF THE INVENTION

Figure 1:
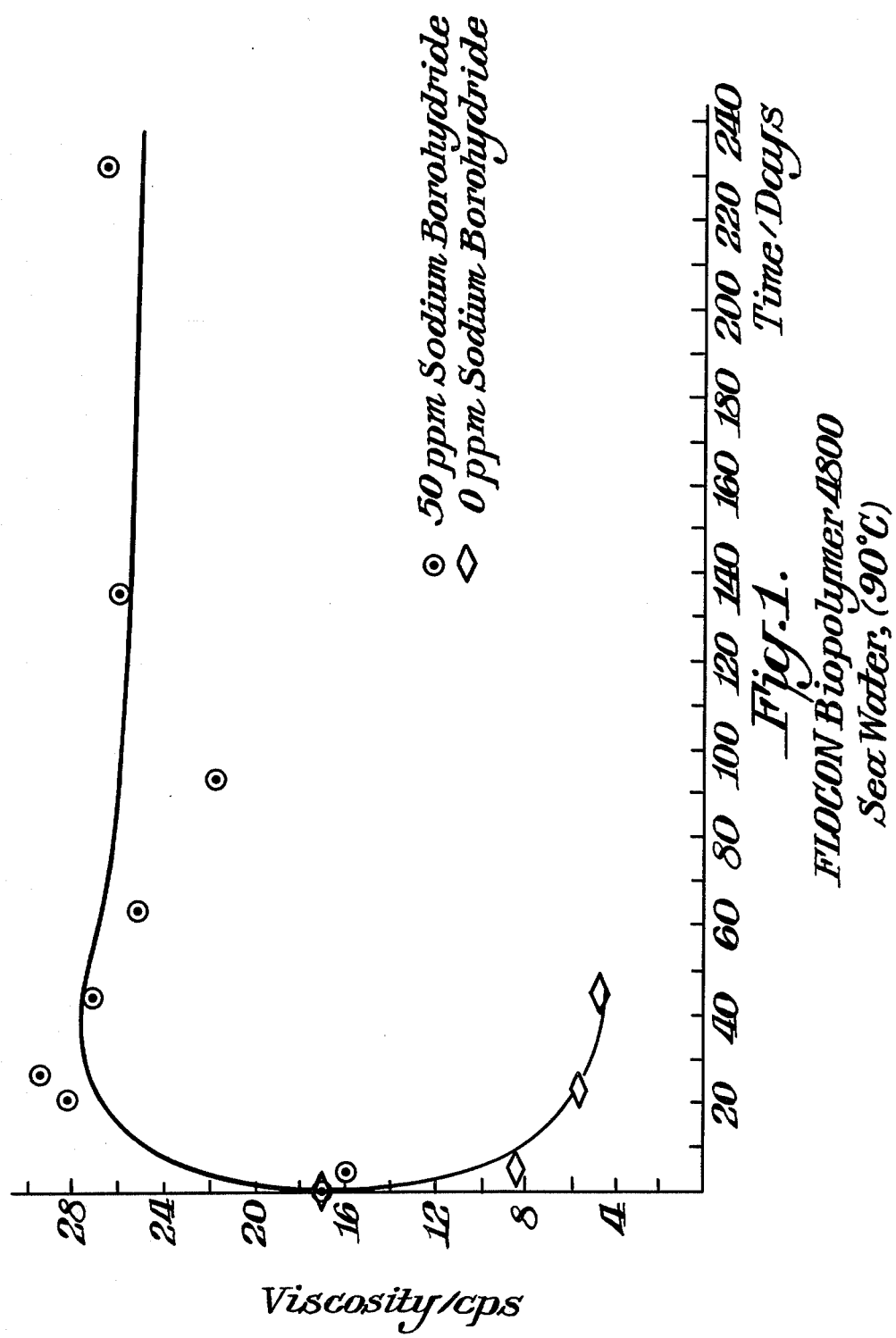
FIGS. 1–4 and 6 are graphs showing the effects of various levels of borohydride addition on the viscosity stability at 90° C. of polysaccharide biopolymer solutions prepared in sea water.

Long-term viscosity stability is an extremely important requirement for mobility control polymers employed in tertiary oil recovery from high temperature (60°–150° C.) subterranean reservoirs. The method of the present invention, which employs for mobility control a substantially oxygen-free aqueous saline solution of polysaccharide biopolymer which has been subjected to reduction treatment, provides this desired stability, little change in the viscosity of the solution occuring after months of use.

The polysaccharide biopolymer employed in the method can be any water-soluble polysaccharide useful in polymer floods. Such biopolymers may include, for example, polysaccharides derived from the genus Sclerotium or related organisms and polysaccharides derived from the genus Alcaligenes or related organisms. Preferably, the biopolymer is xanthan, a polysaccharide derived from fermentation of carbohydrate by the bacteria of the genus Xanthomonas, especially the species *Xanthomonas campestris*. Suitable polysaccharide broth preparations include, for example, those disclosed in U.S. Pat. Nos. 3,301,848, 4,119,546 and 4,296,203, which are incorporated herein by reference. The polymer may be employed in the form of unreconstituted broth or may be reconstituted after isolation from the broth. Normally, the concentration of the polymer in the flood control solution is from about 100 to 2,000 ppm, preferably from about 300 to 1,500 ppm, by weight to provide a solution viscosity of from about 2 to 50 centipoises.

To produce the mobility control solution, the polysaccharide biopolymer is dissolved in aqueous saline solution at a pH of about 5 or greater. Normally this salinity, defined as the soluble salt or ion content present in a saline solution expressed in milligrams total salt per kilogram brine solution, will be about 1,000 ppm or greater. The high temperature stability of the control solution improves with salinity, saline solutions with a dissolved salt content of 20,000 ppm or greater being especially effective. The pH of the saline polymer solution at the time of preparation should be 5 or greater to prevent the deterioration of the stabilizing agent and the acid catalyzed hydrolysis of the polysaccharide, a pH of from about 7 to 8 being preferred.

While the mechanism of the stabilization process is not thoroughly understood, it is believed that the stability of the polysaccharide solution is provided by the inclusion of alkali metal borohydride at a level which results in reduction of oxidizing species in the polymer solution prior to exposure to high temperatures. This normally requires the addition of borohydride to the solution in the amount of from about 5 to 100 ppm, preferably 10 to 50 ppm, by weight of the control solution, whereby undesirable oxidizing species or transition metals are believed to be rapidly reduced. The oxidizing species may be dissolved oxygen or peroxy species generated in the broth by air required in the aerobic processing of the broth in the presence of trace amounts of transition metals. It is desirable to have a low dissolved oxygen content when the stabilizer is used, and this is most readily accomplished by use of separated recycled brine produced from the reservoir where anerobic conditions exist. Natural gas or other cheap inert gas blankets may be used in surface handling to maintain anerobic conditions.

The borohydride addition may occur either before or after the polymer addition to the saline solution. The treatment may also be applied to the fermentation broth before dilution in field brine or other processing. Any alkali metal borohydride or substituted borohydride such as sodium cyanoboride may be used. Of particular value is sodium borohydride.

The stabilization process results in a substantially oxygen-free polymer control solution at the time of injection of the solution into the oil-bearing formation. By substantially oxygen-free solution is meant a solution which indicates a dissolved oxygen content of 0.5 ppm or less when tested with the dissolved oxygen test kit supplied by Chemetrics, Inc., Warrenton, Virginia.

An initial increase in viscosity of xanthan solutions upon heating is common, having been noted previously, for example, in U.K. Patent Application G.B. No. 2000823A. This effect, referred to as viscosity build, is not well understood but is believed to arise from conformational changes in the polymer. In unstabilized systems, polymer degradation may occur faster than the viscosity build. The situation is complex since both temperature and salinity affect the kinetics of viscosity build and degradation. The viscosity build phenomenon is evident in a number of examples disclosed herein. However, all xanthan broths do not exhibit viscosity build, and xanthan broths that do not exhibit viscosity build can still be stabilized.

Other components which do not deleteriously affect the beneficial effect of the stabilizer on viscosity may also be incorporated in the mobility control solution. Such components might include, for example, biocides such as formaldehyde to prevent microbial deterioration of the polysaccharide biopolymer and chelating agents such as sodium citrate to sequester polyvalent ions such as iron.

The following examples are merely illustrative and are not to be construed as limiting the invention, the scope of which is defined by the appended claims.

EXAMPLE 1

A mixture of 16 g of a commercial liquid form of xanthan biopolymer[1] and 733.9 g of synthetic sea water[2] was mechanically stirred under a nitrogen atmosphere for 60 minutes. To this mixture was added 0.0375 g of solid sodium borohydride. Stirring was continued for 30 minutes, and 0.0375 g of a commercial biocide[3] was then added. The mixture was stirred briefly and allowed to stand at 25° C. overnight.

A 34-ml aliquot of this solution (747 ppm of xanthan and 50 ppm of sodium borohydride) was transferred by syringe to a nitrogen-flushed ampule, and the ampule was sealed with a torch; the size of the ampule was such that 1 ml of gas space remained after sealing. A series of ampules was prepared in this manner and placed in an oil bath at 90° C. after standing for 24 hours at 25° C. Viscosities (25° C.) of the biopolymer solution after the indicated times at 90° C. are shown in FIG. 1.

A series of ampules containing no borohydride was prepared and tested, with the results also shown in FIG. 1.

(1) FLOCON Biopolymer 4800 (3.5 percent assay), Pfizer Inc., New York, New York (contains 2000–3000 ppm formaldehyde to inhibit microbial growth)
(2) NaCl 23.89 g, $MgCl_2.6H_2O$ 10.76 g, $CaCl_2$ 1.241 g, $Na_2SO_4$ 4.288 g, $NaHCO_3$ 0.205 g to 1000 g with deionized water
(3) XCide 215, Rohm and Haas, Philadelphia, Pennsylvania

EXAMPLE 2

Figure 2:
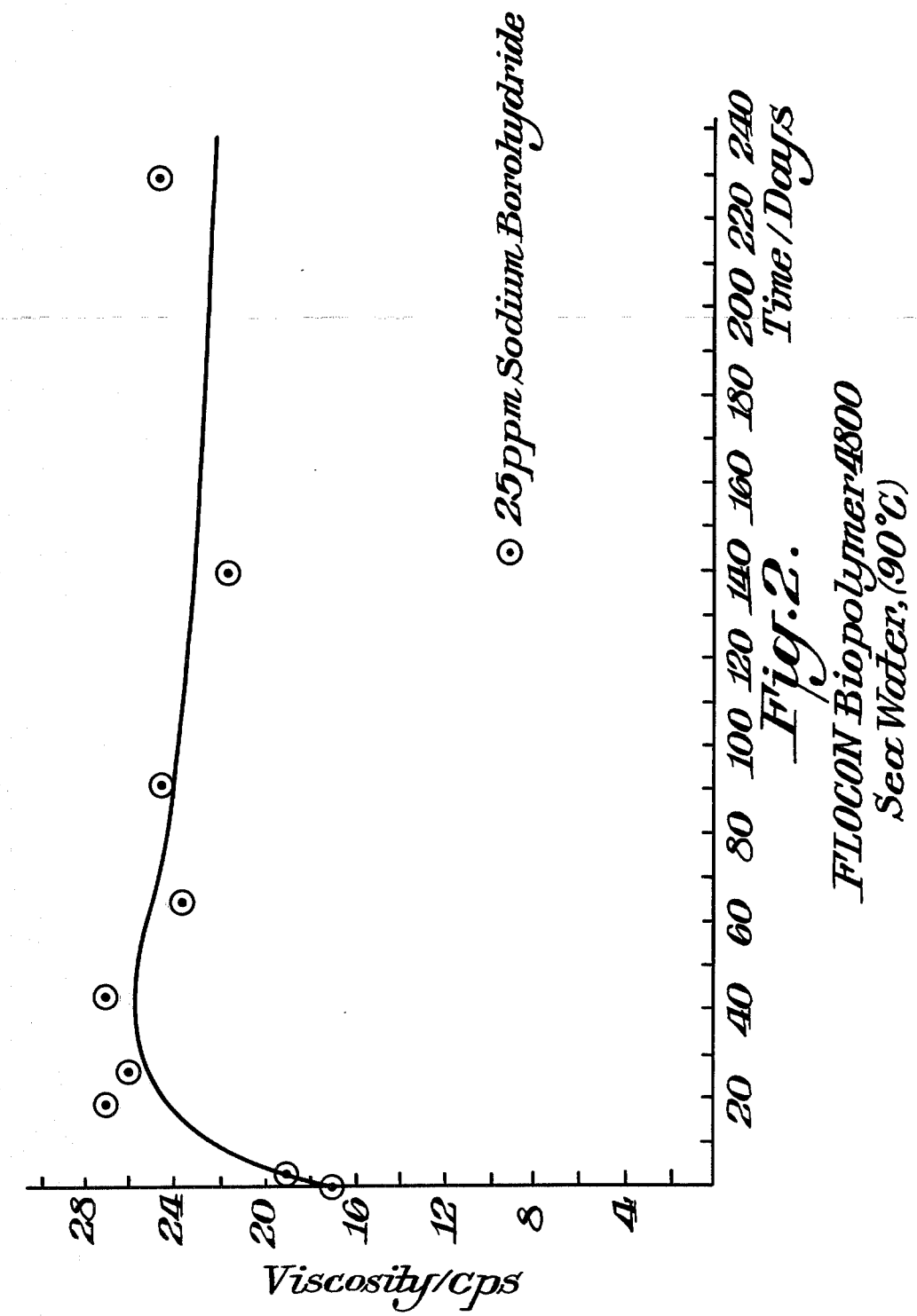

The procedure of Example 1 was repeated with the exception that 0.0188 g of solid sodium borohydride was used, the biopolymer solution thereby initially containing 747 ppm xanthan and 25 ppm sodium borohydride. Results of this testing are shown in FIG. 2.

EXAMPLE 3

Figure 3:
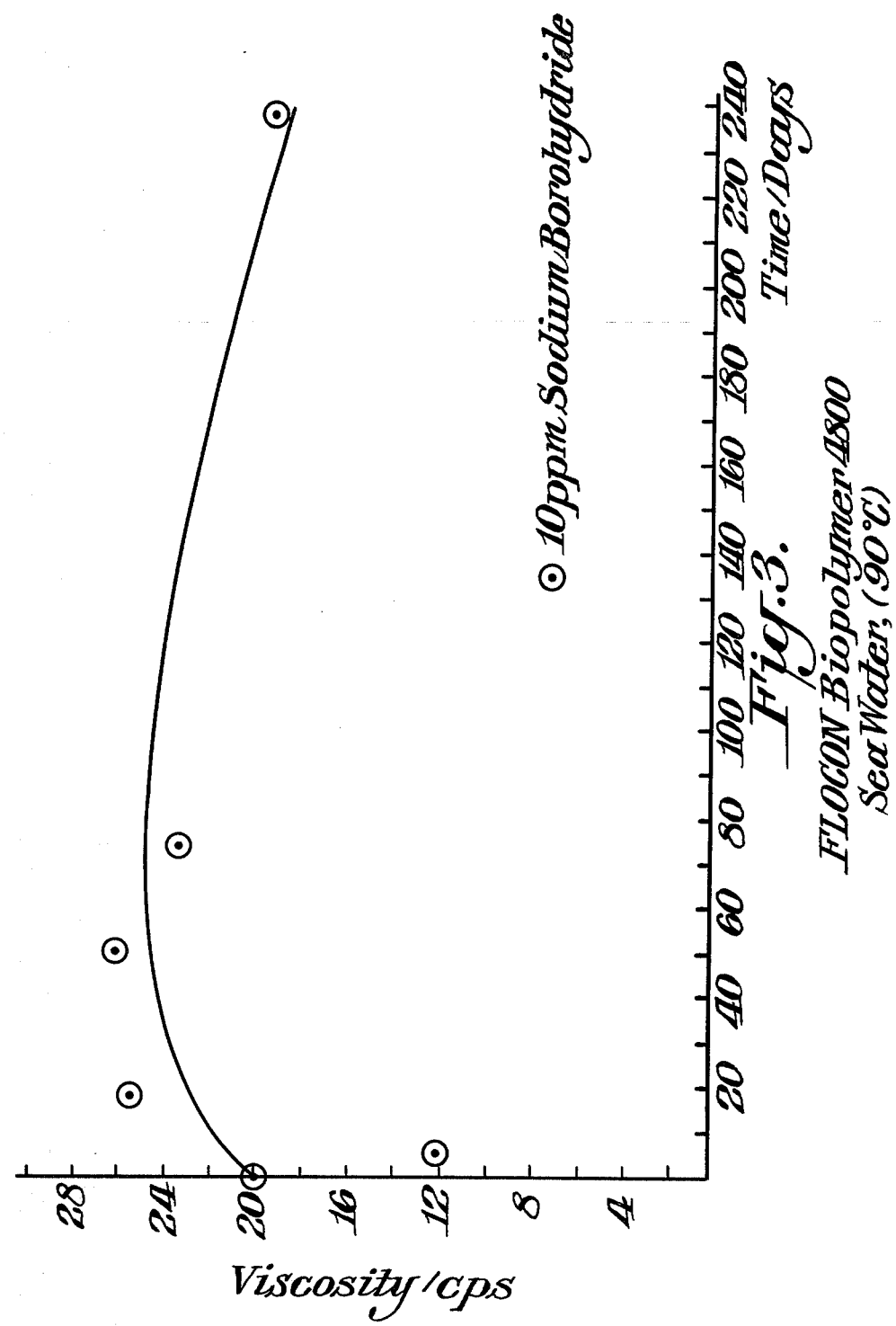

The procedure of Example 1 was repeated with the exception that 0.0076 g of sodium borohydride was utilized and the sealed ampules were placed in the 90° C. oil bath on the same day that the sealing process was carried out, the biopolymer solution initially containing 750 ppm of xanthan and 10 ppm of sodium borohydride. Results of this testing are shown in FIG. 3.

EXAMPLE 4

Figure 4:
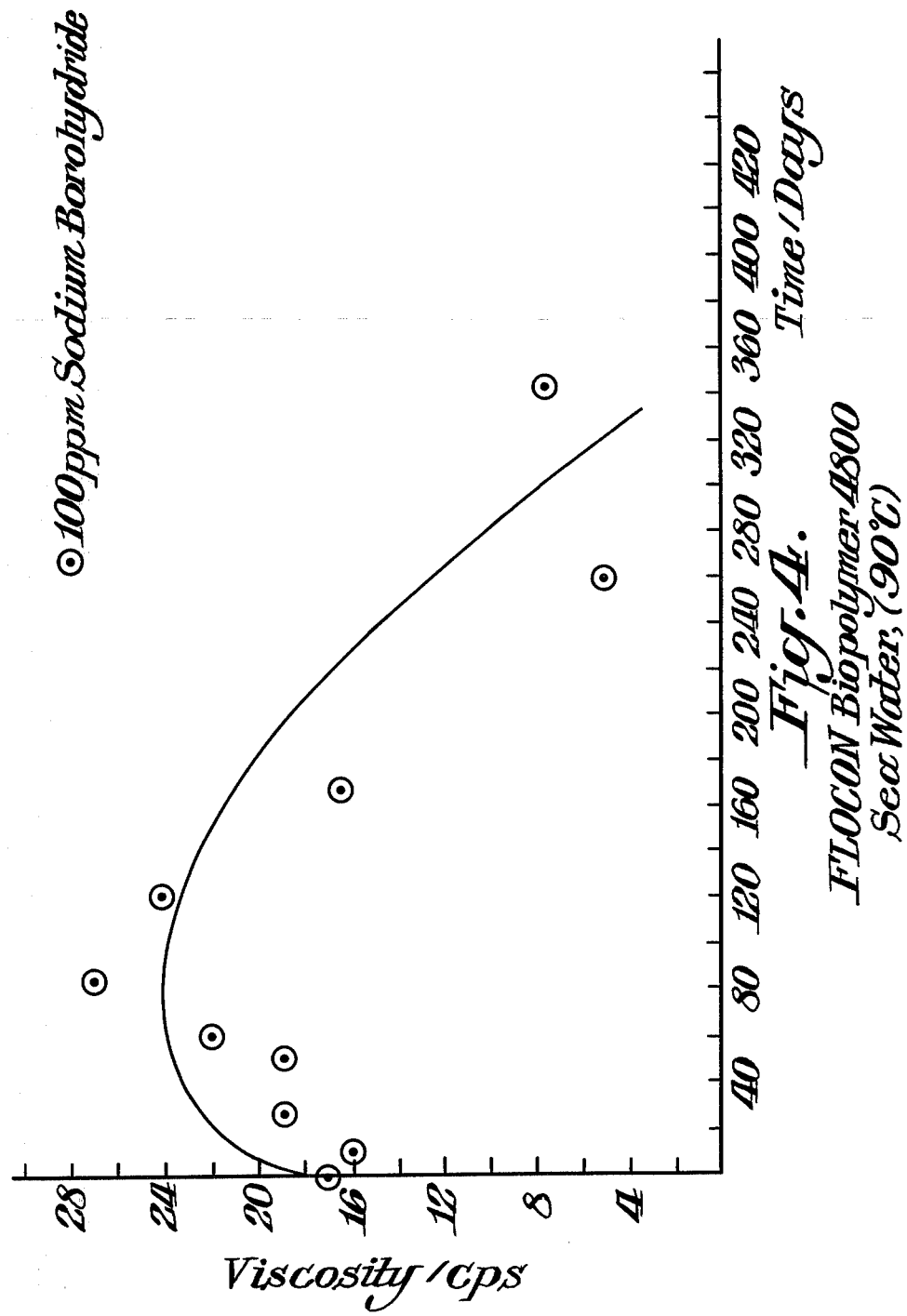

The procedure of Example 1 was repeated with the exception that 0.075 g of solid sodium borohydride was utilized, the biopolymer solution initially containing 747 ppm of xanthan and 100 ppm of sodium borohydride. Results of this testing are shown in FIG. 4.

EXAMPLE 5

Figure 5:
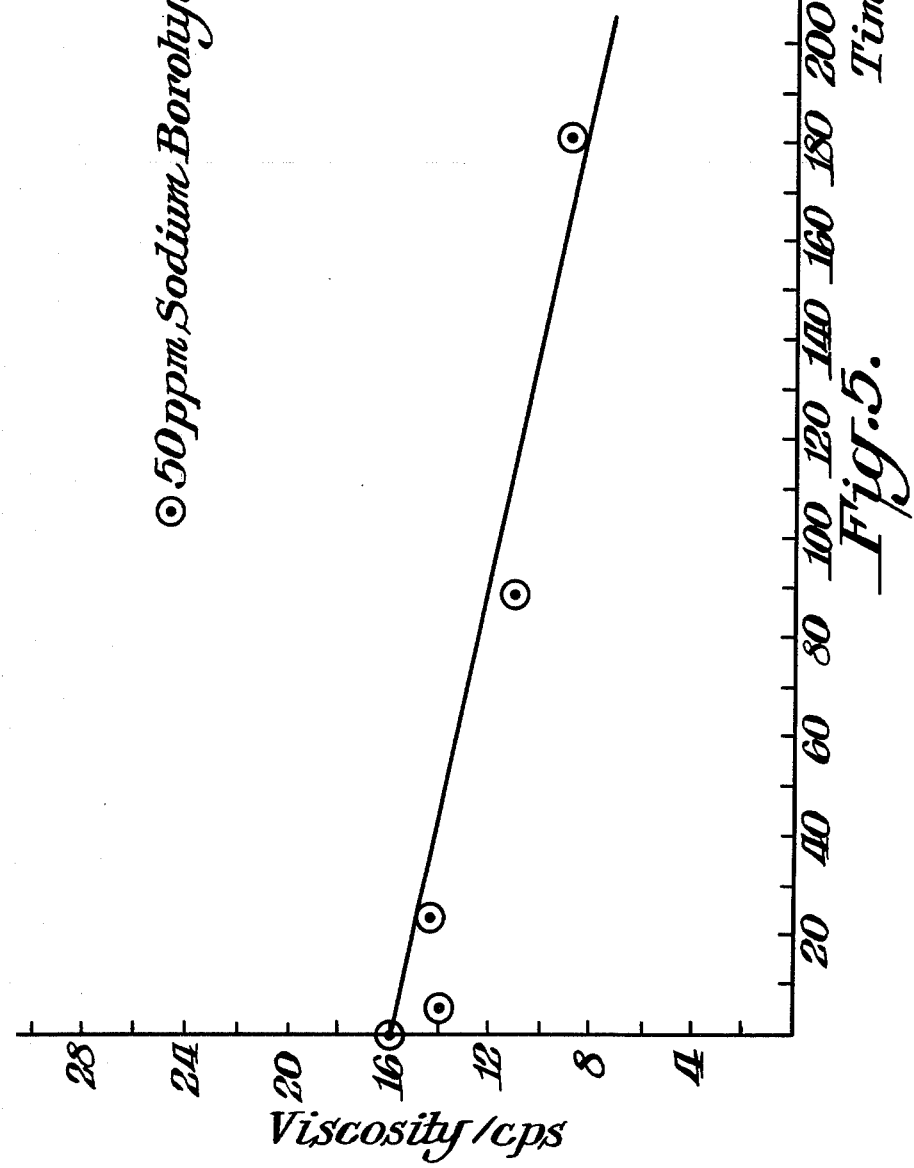
FIG. 5 is a graph showing the effect of borohydride addition on the viscosity stability at 90° C. of polysaccharide biopolymer prepared in 0.3 percent aqueous sodium chloride solution.

A mixture of 16 g of the commercial liquid form of xanthan used in Example 1 and 734 g of 0.3 percent sodium chloride solution was mechanically stirred under nitrogen for 1 hour. To the stirred mixture was added 0.0375 g of solid sodium borohydride. A series of ampules was prepared and tested as in Example 1, with the results shown in FIG. 5.

EXAMPLE 6

Figure 6:
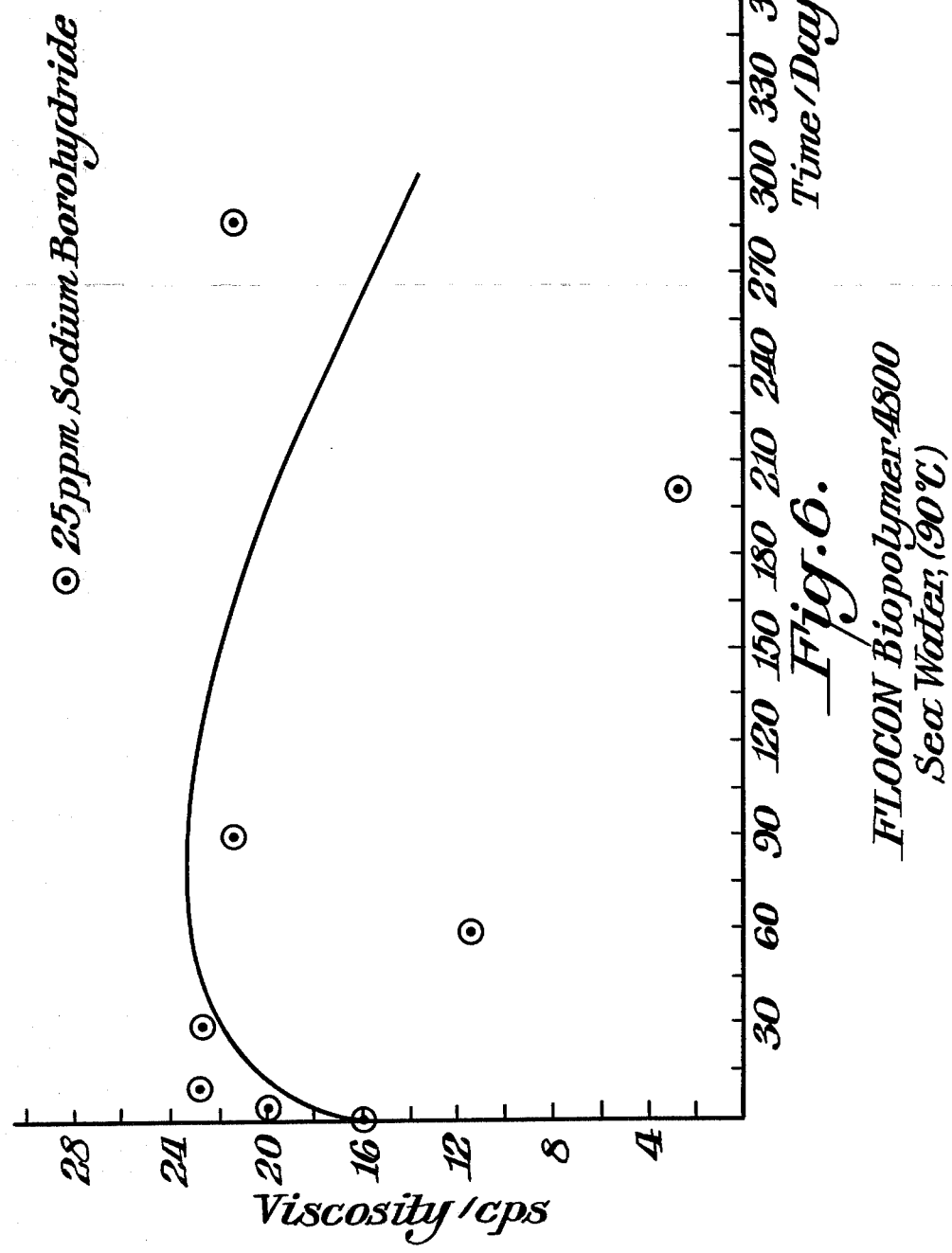

A mixture of 17.8 g of a formaldehyde-free xanthan broth (4.2 percent assay) and 982.2 g of synthetic sea water was mechanically stirred under nitrogen for 1 hour. To this stirred mixture was added 0.0250 g of solid sodium borohydride, and stirring was continued for 30 minutes. A series of ampules was prepared and tested as in Example 1. Results of this testing are shown in FIG. 6.

We claim:

1. A method of oil recovery from a subterranean petroleum-containing formation at elevated temperature penetrated by at least one injection well and by one production well in fluid communication with the formation, which comprises injecting into said formation a substantially oxygen-free aqueous saline solution of a water-soluble polysaccharide biopolymer which has been treated in solution at a pH of at least about 5 by the addition of an effective amount of alkali metal borohydride as viscosity stabilizer.

2. The method of claim 1 wherein said biopolymer is derived from a fermentation broth containing cells of an organism belonging to the genus Xanthomonas.

3. The method of claim 2 wherein said addition is from about 10 to 50 ppm of sodium borohydride.

4. The method of claim 2 wherein said saline solution has a dissolved salt content of at least about 20,000 ppm.

5. The method of claim 1 wherein said addition is from about 5 to 100 ppm of said borohydride.

* * * * *